(12) United States Patent
Adamski

(10) Patent No.: US 8,256,832 B2
(45) Date of Patent: Sep. 4, 2012

(54) ROOF MODULE FOR A MOTOR VEHICLE

(75) Inventor: Pawel Adamski, Wildberg (DE)

(73) Assignee: Dr. Ing. h.c.F. Porsche Aktiengesellschaft (DE)

(*) Notice: Subject to any disclaimer, the term of this patent is extended or adjusted under 35 U.S.C. 154(b) by 0 days.

(21) Appl. No.: 13/081,797

(22) Filed: Apr. 7, 2011

(65) Prior Publication Data

US 2011/0254322 A1    Oct. 20, 2011

(30) Foreign Application Priority Data

Apr. 19, 2010 (DE) .......................... 10 2010 015 403

(51) Int. Cl.
*B60J 7/00* (2006.01)

(52) U.S. Cl. .................................................. 296/216.08

(58) Field of Classification Search .............. 296/216.01, 296/210, 203.03, 214, 216.06–216.08
See application file for complete search history.

(56) References Cited

U.S. PATENT DOCUMENTS

| | | | |
|---|---|---|---|
| 3,776,589 A | 12/1973 | Barenyi et al. | |
| 7,407,222 B2 * | 8/2008 | Anderson et al. | 296/193.06 |
| 7,758,109 B2 * | 7/2010 | Reed et al. | 296/210 |
| 7,905,542 B2 * | 3/2011 | Marx et al. | 296/216.08 |
| 2009/0033128 A1 | 2/2009 | Hoelzel | |

FOREIGN PATENT DOCUMENTS

| | | |
|---|---|---|
| DE | 2 104 454 | 8/1972 |
| DE | 101 60 885 | 7/2003 |
| DE | 10 2007 036 366 | 2/2009 |

* cited by examiner

*Primary Examiner* — Dennis Pedder

(74) *Attorney, Agent, or Firm* — Gerald E. Hespos; Michael J. Porco

(57) ABSTRACT

A roof module for a motor vehicle has an inner frame connected to a roof that has an opening for panorama roof parts that are displaceable in guide rails in the longitudinal direction of the vehicle and have glass sections. A transversely running reinforcing support can be fit retrospectively in a central region of the inner frame of the roof module, as seen in the direction of travel, at a distance behind B pillars. Free ends of the reinforcing support are held in receiving brackets on frame parts on the longitudinal sides of the inner frame.

7 Claims, 8 Drawing Sheets

ROOF MODULE FOR A MOTOR VEHICLE

CROSS REFERENCE TO RELATED APPLICATION

This application claims priority under 35 USC 119 to German Patent Application No 10 2010 015 403.2 filed on Apr. 19, 2010, the entire disclosure of which is incorporated herein by reference.

BACKGROUND OF THE INVENTION

1. Field of the Invention

The invention relates to a roof module for a motor vehicle with an inner frame connected to a roof that has an opening for panorama roof parts that are displaceable longitudinally in guide rails and that have glass sections.

2. Description of the Related Art

DE 101 60 885 A1 discloses a motor vehicle passenger cell with a roof crossmember connected to B pillars and to roof longitudinal members of the vehicle body.

It is the object of the invention to provide a motor vehicle roof module with a reinforcing support to be installed in a simple manner in a roof cutout of a vehicle roof and that ensures transverse forces are transmitted between B pillars of a vehicle body.

SUMMARY OF THE INVENTION

The invention relates to a reinforcing support located on the inside of the vehicle and arranged transversely in the vehicle. The reinforcing support can be fit retrospectively together with an inner frame of the roof module. The inner frame of the roof module has a transversely running reinforcing support in a central region at a distance behind the B pillars of the vehicle body, as seen in the direction of travel of the vehicle. The transversely running reinforcing support has free ends held in lateral receiving brackets arranged fixedly, for example by welding, on frame parts on the longitudinal sides of the inner frame.

The receiving brackets each have a V-shaped receiving section for secure and stable mounting of the reinforcing support. The V-shaped receiving section has limbs that are bent in a plane and align with a corresponding V-shaped formation of the reinforcing support that also has limbs bent in a plane. The reinforcing support is arranged in a form-fitting manner in the receiving section of the receiving bracket. These corresponding receptacles in the receiving bracket and the reinforcing support enable precise positioning and fixing of the components with respect to one another and therefore achieve optimum transverse force absorption.

The V-shaped receiving section of the bracket preferably protrudes with respect to the lower side and projects with respect to the outer longitudinal side of the inner frame to further reinforce the strength of the receiving bracket. Each bracket is connected on the upper side of the inner frame to a reinforcing plate.

The reinforcing plate on each longitudinal side of the inner frame preferably extends on the upper side of the inner frame both over the frame part on the longitudinal side of the inner frame and extends over to cover the projecting receiving bracket. The receiving bracket and the reinforcing plate placed over the receiving bracket define a construction unit that has stiffening profiling as a "junction point" for fixing the reinforcing support to the inner frame of the roof module.

The reinforcing support is fastened to the receiving bracket via fastening screws. More particularly, outer fastening screws are provided on the reinforcing plate and the limbs of the receiving bracket and the limbs of the reinforcing support penetrating from above and are held in outer weld nuts on the limbs of the formation of the reinforcing support.

A further weld nut is arranged centrally in a web of the V-shaped formation of the reinforcing support, and the outer weld nuts are arranged in the bent limbs of said formation. The web of the formation is connected directly to the opposite web of the receiving section via the central fastening screw, which can be screwed into the central weld nut of the reinforcing support. This triple fastening of the reinforcing support to the receiving bracket and the fastening to the reinforcing plate achieves a stable and secure connection to the inner frame of the roof module.

A U-shaped receptacle for the frame parts on the longitudinal sides of the inner frame directly adjoins the V-shaped formation of the reinforcing support so that the inner frame also can be received at the same time by the reinforcing support for additionally absorbing transverse forces acting on the roof.

A keyhole receptacle is provided on the guide rail at each end of the reinforcing support and can receive a hook-shaped receiving element for precisely fixing and positioning the reinforcing support on the inner frame of the roof module. The receptacle is a square opening with an adjoining slot that runs in the longitudinal direction of the vehicle and into which a web of the hook-shaped receiving element can be inserted by longitudinally displacing the reinforcing support.

The inner frame for the panorama roof is welded on the left and right sides in the region of the two B pillars of the vehicle body to the transversely running, outwardly protruding, lateral reinforcements, such as the receiving bracket. The subassembly then is connected to the outer roof by flanging and subsequently is placed onto the body shell and connected thereto by welding/adhesive bonding. The panorama roof, which consists of two glass sections, is installed subsequently. The inner reinforcing support is fit after the panorama roof is installed and the two lateral ends of the inner reinforcing support are connected to the lateral roof frames of the inner frame via the screw connections. The retrospectively fitted transverse support essentially has the task of transmitting transverse forces between the two B pillars.

An exemplary embodiment of the invention is illustrated in the drawings and is described in more detail below.

DETAILED DESCRIPTION OF THE PREFERRED EMBODIMENTS

Figure 1:
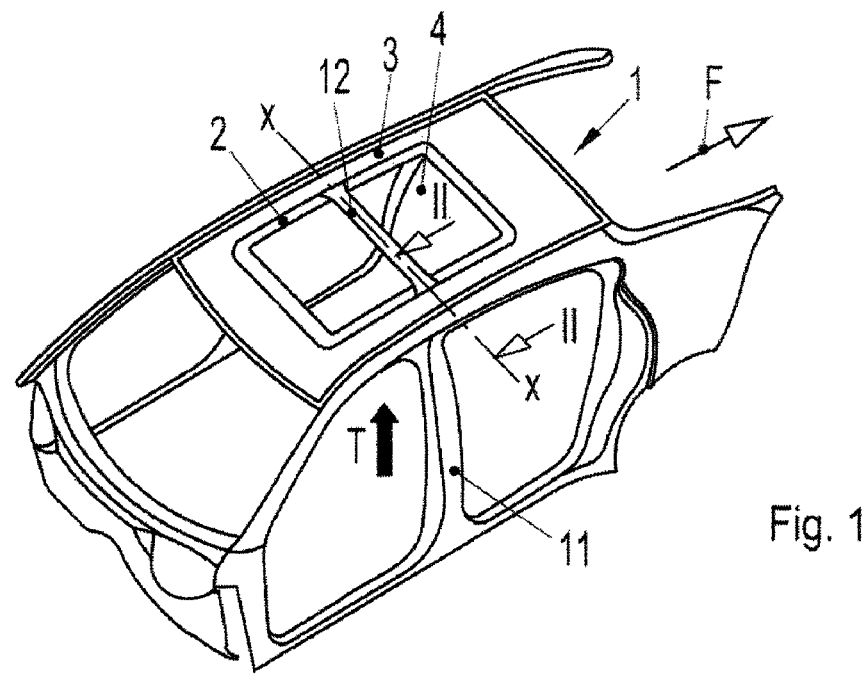
FIG. 1 is a diagrammatic illustration of a vehicle body with a transversely running reinforcing support in the cutout of a roof module.
Figure 2:
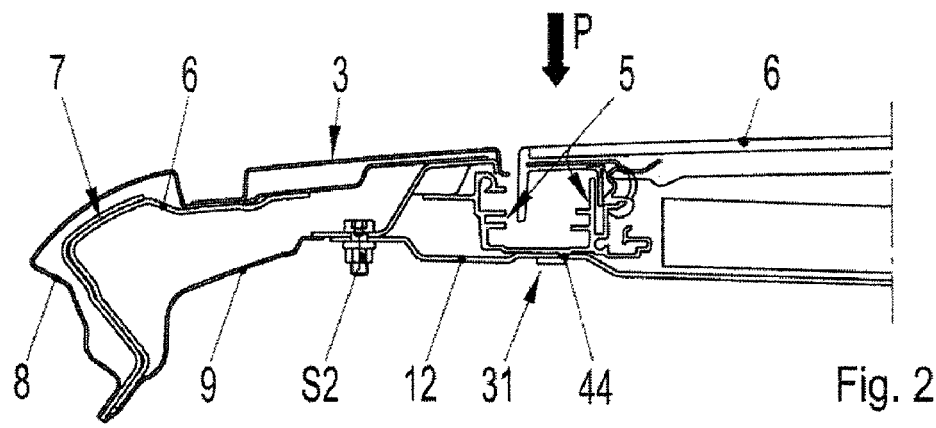
FIG. 2 is a cross-section of the roof module taken along line II-II of FIG. 1.
Figure 12:
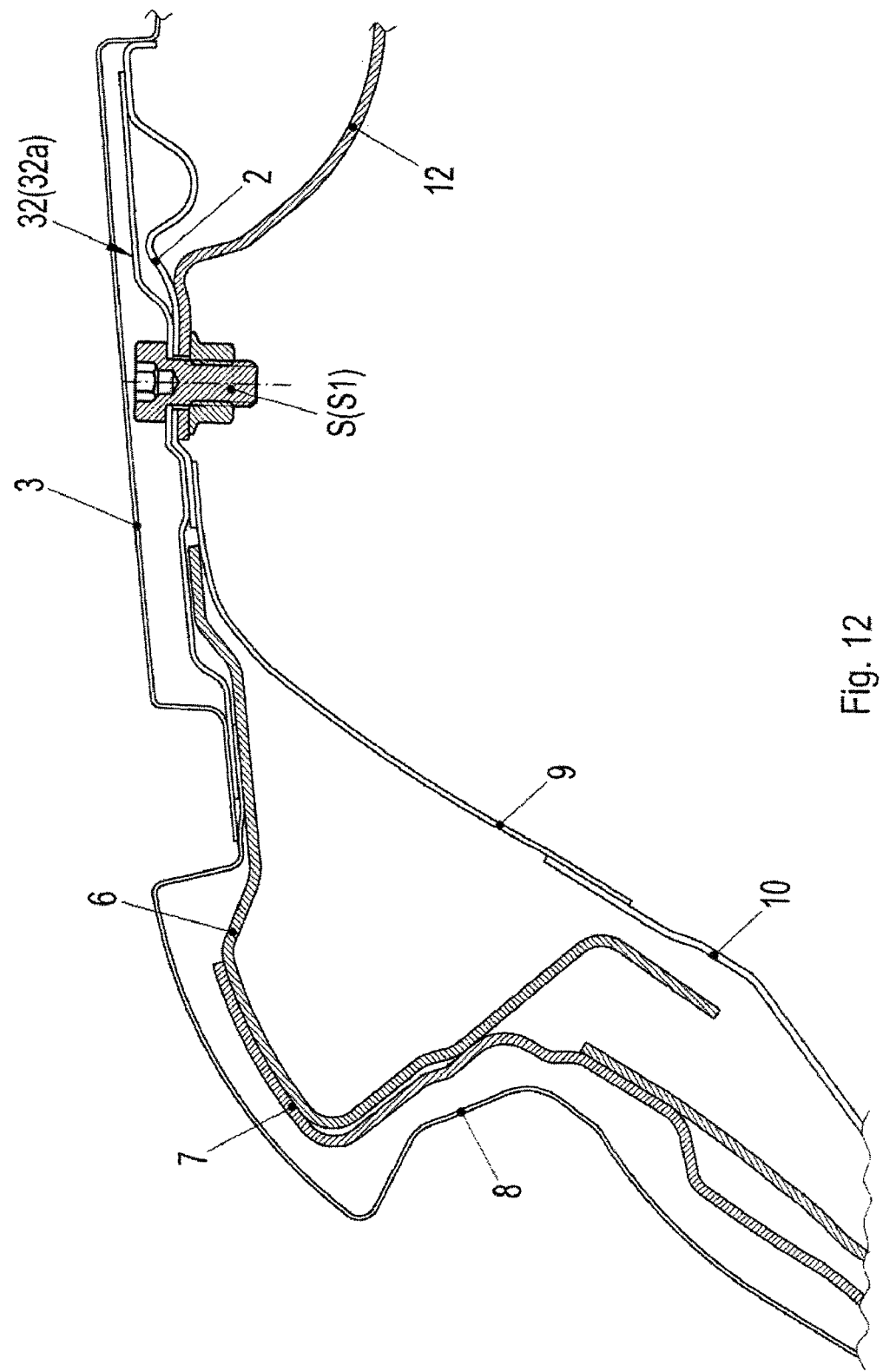
FIG. 12 is a cross section through the roof in the region of a fastening point to the receiving bracket.

A roof module 1 for a motor vehicle is illustrated in FIG. 1 and comprises an inner frame 2 in a roof 3 that has a cutout 4 for a "panorama roof". The panorama roof has glass sections that are displaceable longitudinally in guide rails 5. The roof module 1 also has a lateral roof frame 6 with a roof frame reinforcement 7 and an outer side part 8. An inner side part 9 has an adjoining reinforcement 10 for a B pillar 11 of the vehicle body, as illustrated in FIG. 12, and is connected to the inner frame 2 of the roof module.

Figure 8:
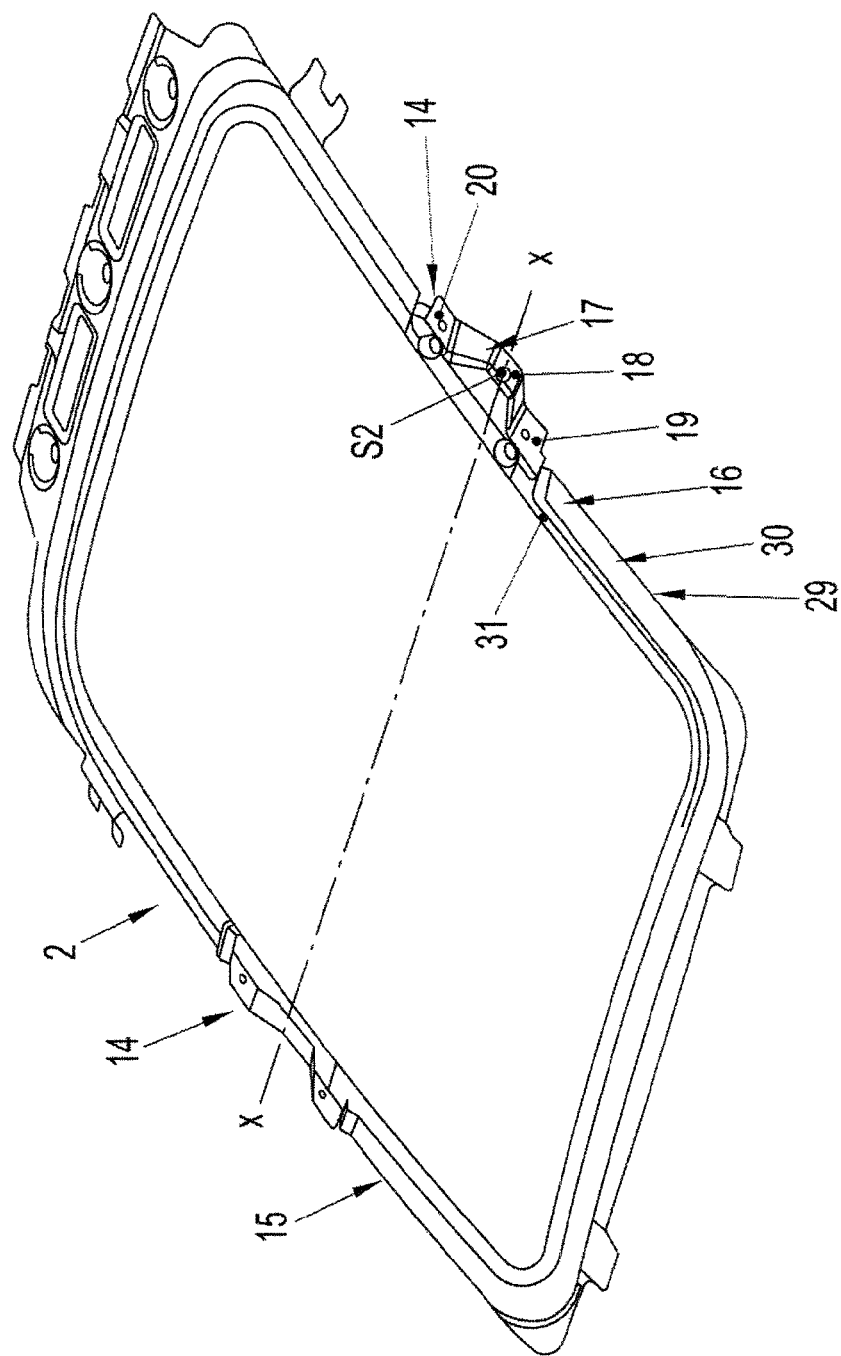
FIG. 8 is a view of the inner frame with lateral receiving brackets.
Figure 9:
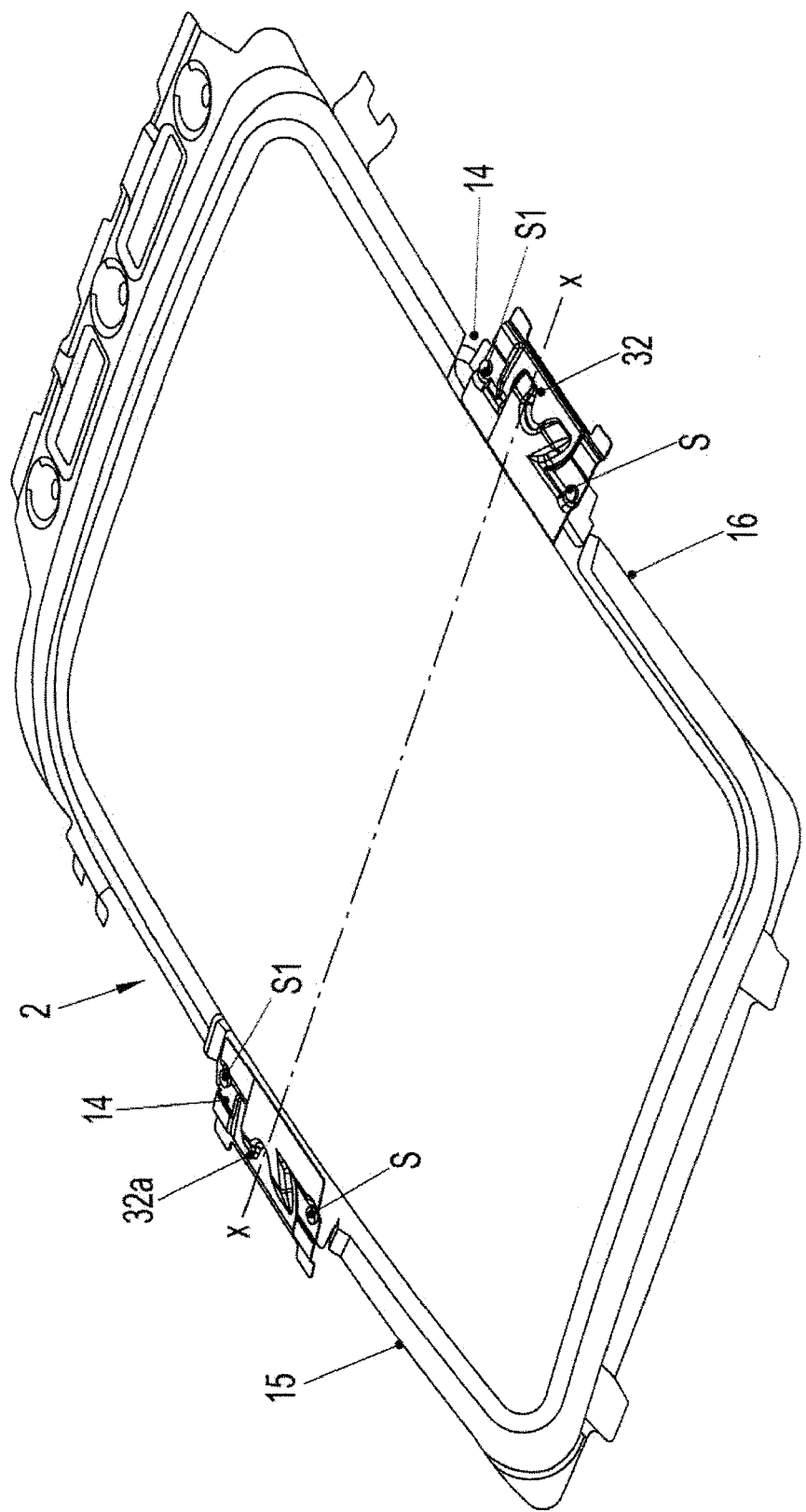
FIG. 9 is a view of the inner frame with lateral receiving brackets and reinforcing plates placed thereon from above.

The inner frame 2 of the roof module 1 has a transversely running reinforcing support 12 in a central region in a transverse plane x-x behind the B pillar 11, as seen with respect to the direction of travel F. Both ends of the reinforcing support 12 are held in receiving brackets 14 that are arranged and fastened on frame parts 15, 16 on the longitudinal sides of the inner frame 2, as shown in FIGS. 8 and 9.

Each receiving bracket 14 has a V-shaped receiving section 17 with a central web 18 and limbs 19, 20 that are bent to lie in a plane. Each end of the reinforcing support 12 has a V-shaped formation 21 that corresponds to the V-shaped receiving section 17 and, in the connecting state, is arranged and held in the V-shaped receiving section 17 with a form fitting reception. The formation 21 also has a central web 22 and limbs 23 and 24 that are bent to lie in a plane.

The reinforcing support 12 has, in cross section, two U profiles 26 and 27 that are connected to each other via a web 25 and open at each end into a longitudinally oriented, U-shaped receptacle 28 joined at the end by the V-shaped receiving section 21.

The central web 18 of the V-shaped receiving section 17 of each bracket 14 protrudes with respect to the lower side 29 of the inner frame 2 and juts out with respect to the longitudinal side 30 of the inner frame 2. Stamped reinforcing plates 32, 32a are arranged on each longitudinal side 15 and 16 of the inner frame 2 and are connected to the bracket 14 in a covering manner.

Figure 10:
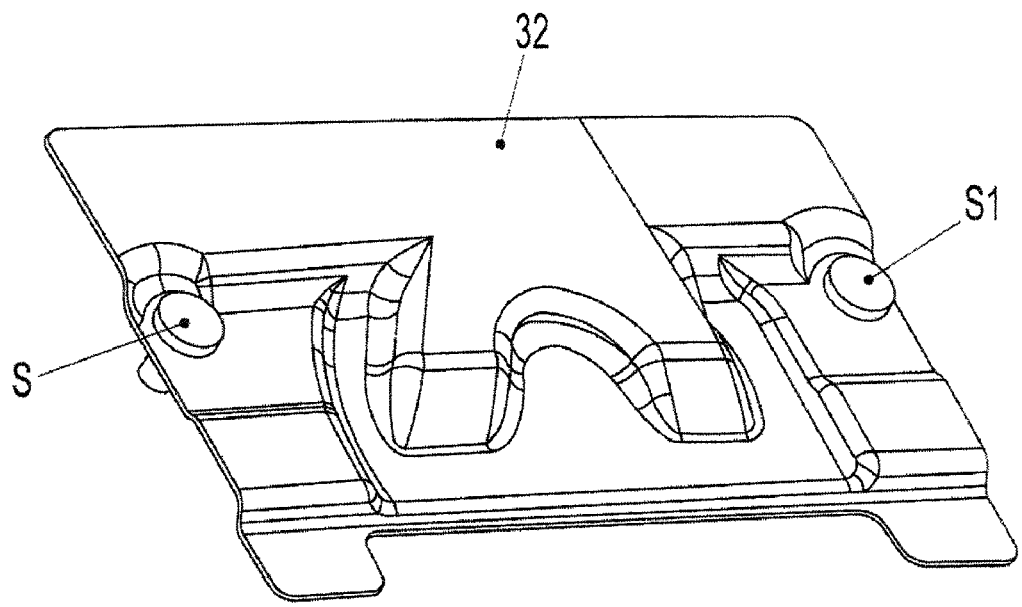
FIG. 10 is a left-side reinforcing plate—as viewed with respect to the direction of travel—in a top view.
Figure 11:
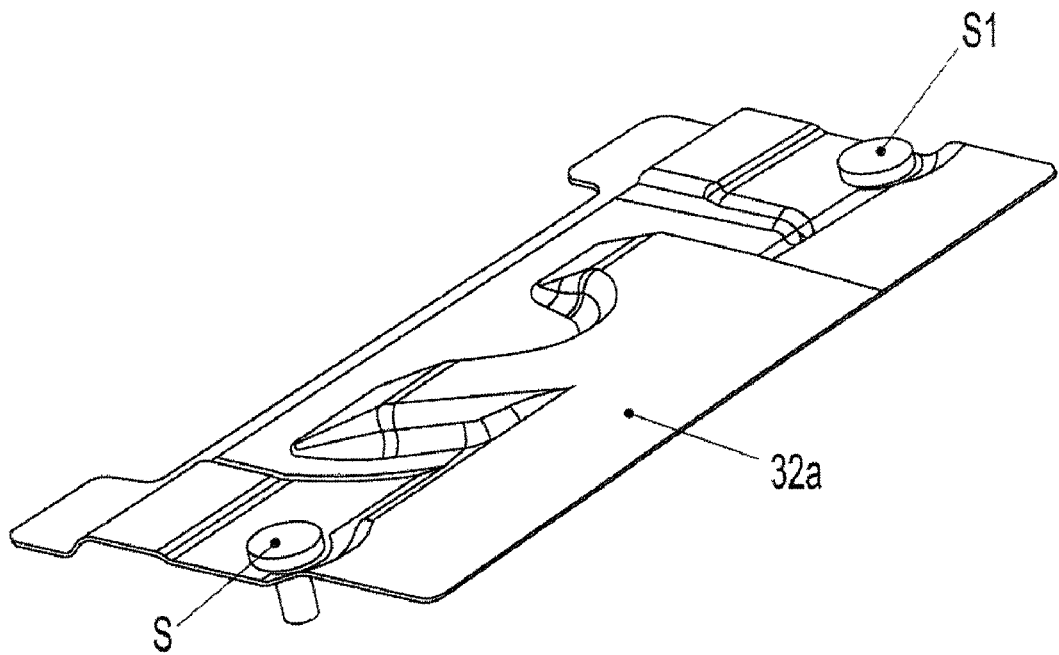
FIG. 11 is a right-side reinforcing plate—as seen in the direction of travel of the vehicle—in a top view.

The reinforcing support 12 is fastened to the receiving bracket 14 fastening screws S, S1 and S2. Outer fastening screws S and S1 are each arranged on the outside in the reinforcing plate 32, 32a, as shown in FIGS. 10 and 11. The fastening screws S and S1 penetrate the receiving bracket 14 in the region of the limbs 19 and 20 and are fixed by being screwed into weld nuts 34 and 35 on the reinforcing support 12. The limbs 19, 20 of the receiving bracket 14 and the opposite limbs 23, 24 of the reinforcing support 12 therefore rest on each other in a manner fastened to each other. The central web 22 of the V-shaped formation 21 of the reinforcing support 12 furthermore bears against the central web 18 of the V-shaped receptacle 17 of the receiving bracket 14 in the connected state. A central screw S2 is held on the web 18 of the receiving bracket 14 and is screwed into the weld nut 36 on the reinforcing support for further fastening the reinforcing support 12 to the receiving bracket 14. The central screw may be omitted.

Figure 5:
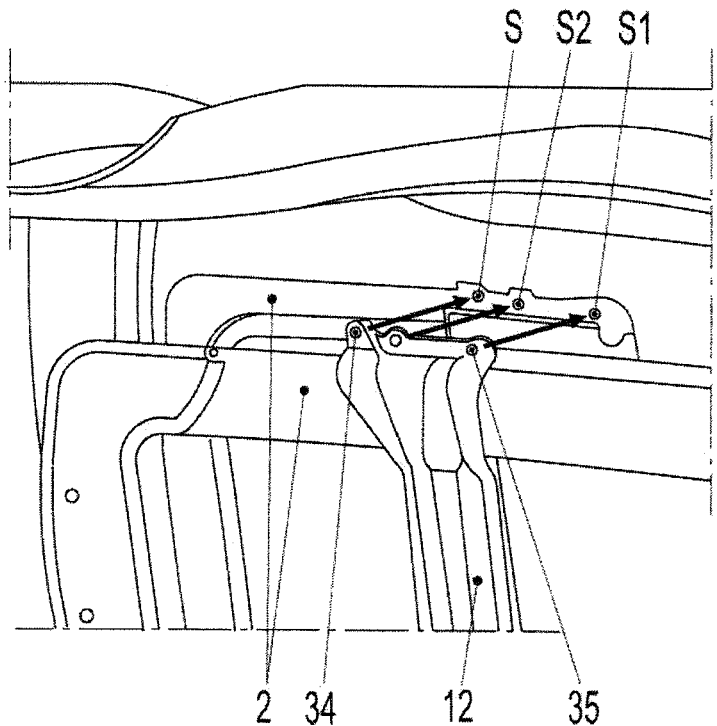
FIG. 5 is a view of the reinforcing support in the direction of the arrow T of FIG. 1, as seen in a non-connected state.
Figure 6:
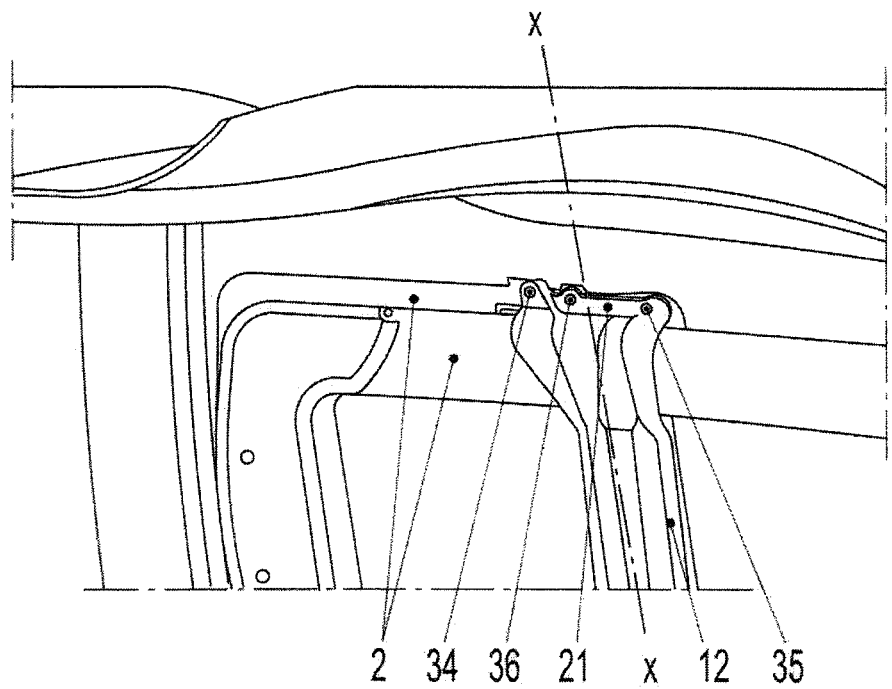
FIG. 6 is a view of the reinforcing support in the direction of the arrow T of FIG. 1, as seen in a connecting state.
Figure 7:
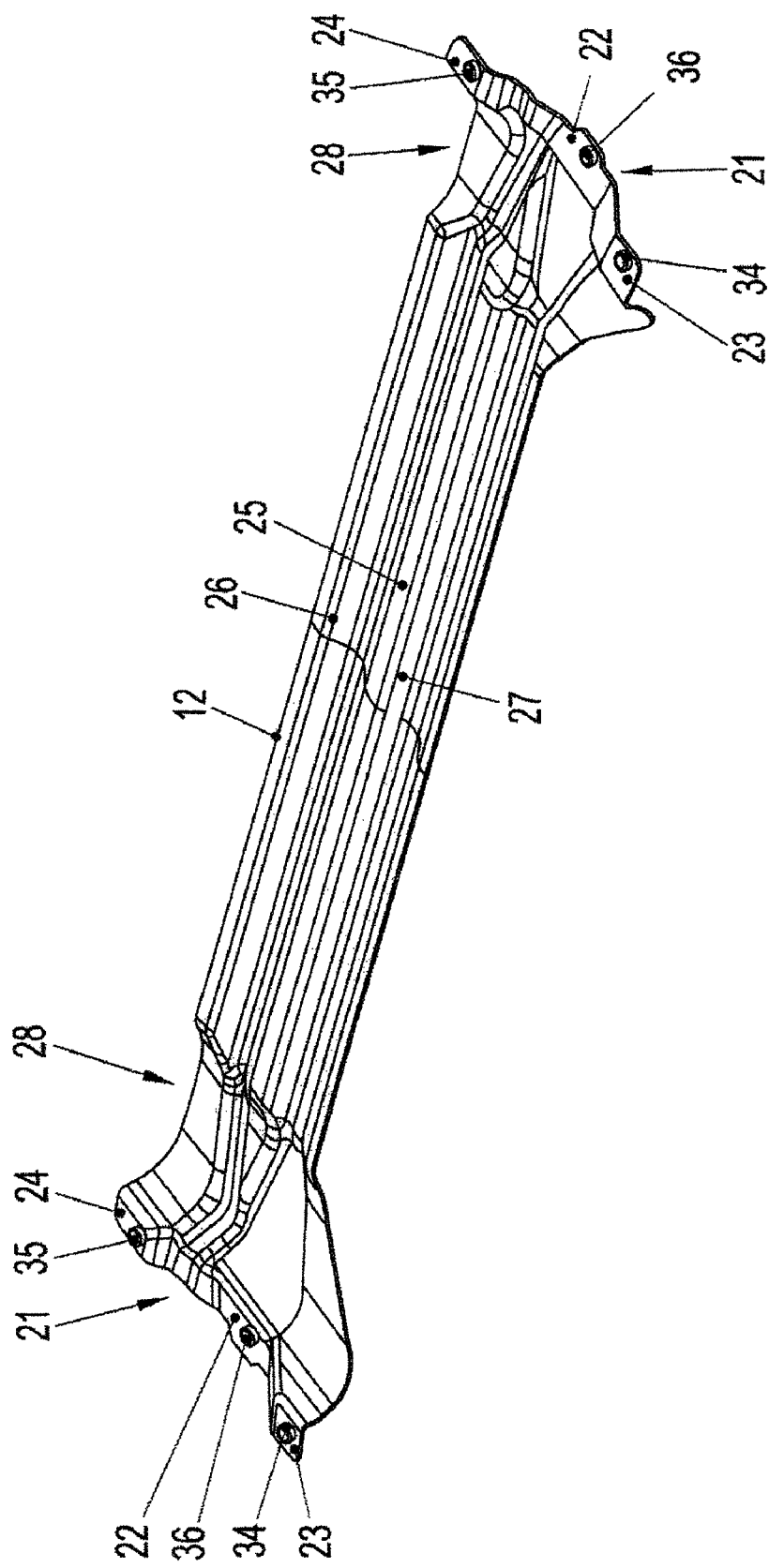
FIG. 7 is a diagrammatic top view of the connecting support.

The U-shaped receptacle 28 at the free end of the reinforcing support 12 joins the V-shaped formation 21 and receives frame parts 15, 16 on the longitudinal sides of the inner frame 2, as illustrated from below in FIGS. 5 and 6.

Figure 3:
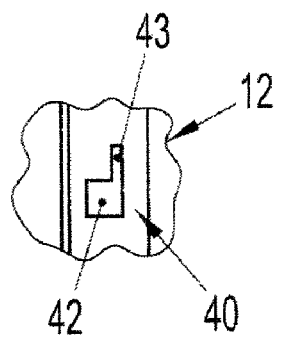
FIG. 3 is a top view of the reinforcing support in the region of a keyhole receptacle, as seen in the arrow direction P.
Figure 4:
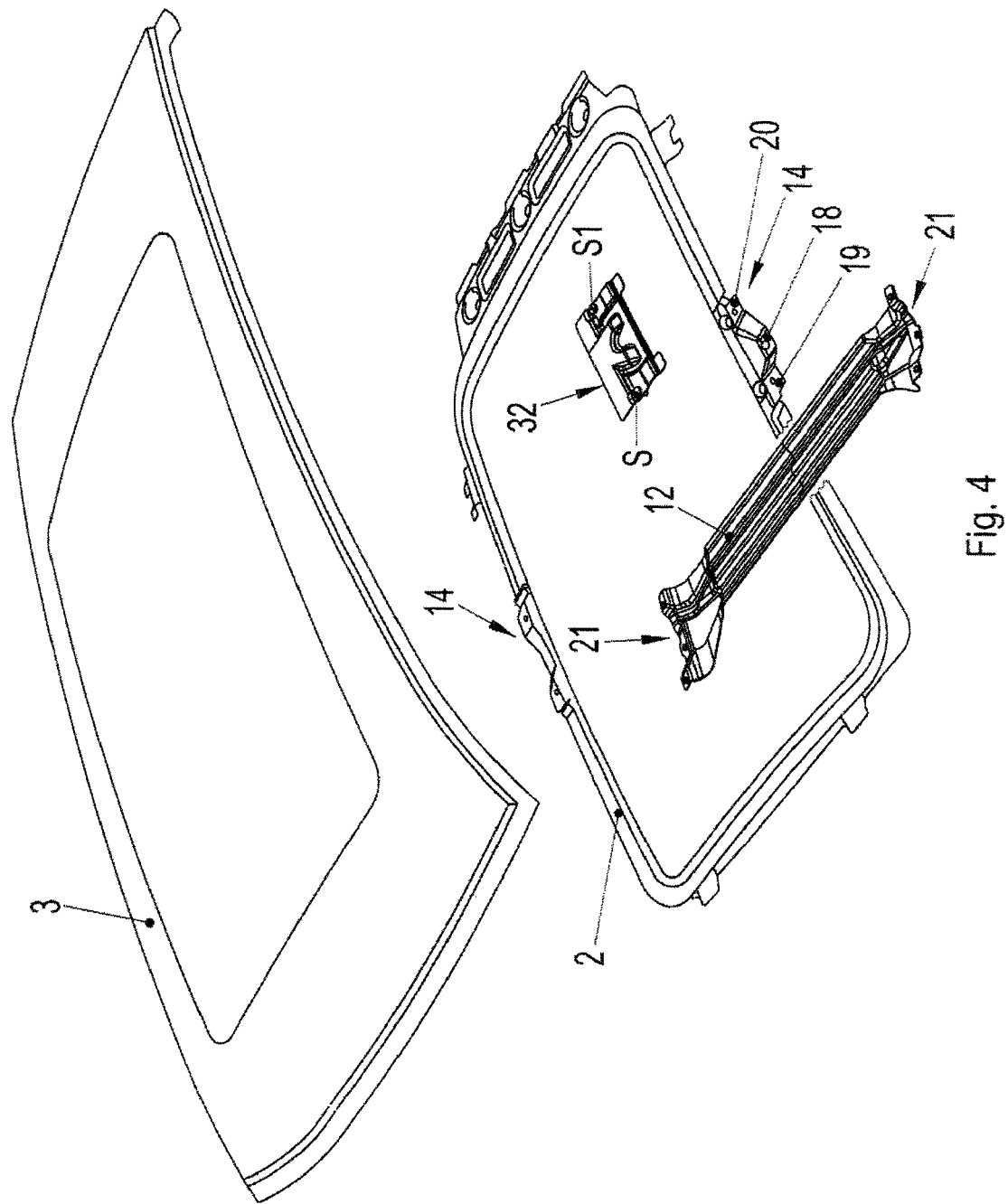
FIG. 4 is a schematic illustration of the roof module with the roof, inner frame and receiving bracket, reinforcing support and lateral reinforcing plates.

The reinforcing support 12 has a "keyhole receptacle" 40 that engages a hook-shaped receiving element 41 of the guide rail 5 to position the reinforcing support 12 with respect to the inner frame 2 for the purpose of fastening via the screws S, S1 and S2. The keyhole receptacle 40 is illustrated in more detail in a top view in FIG. 3 and has a square insertion opening 42 with an adjoining slot 43 that runs in the longitudinal direction of the vehicle and into which a web 44 of the hook-shaped receiving element 41 can be inserted by displacing the reinforcing support 12 in the longitudinal direction.

What is claimed is:

1. A roof module for a motor vehicle, with an inner frame that is connected to a roof with an opening for panorama roof parts that are displaceable in guide rails in the longitudinal direction of the vehicle, the roof module comprising: an inner frame with left and right longitudinal frame parts, receiving brackets arranged fixedly in a central region of the frame parts at a distance behind B pillars of the motor vehicle, each of the receiving brackets defining an upwardly open channel with divergent limbs bent to lie in a plane, the channel of the receiving bracket protruding from a lower side of the inner frame and jutting out laterally from an outer longitudinal side of the inner frame, each receiving bracket being connected on an upper side of the inner frame to a reinforcing plate, and a transversely aligned reinforcing support with left and right ends held in the respective receiving brackets of the frame parts of the inner frame, each of receiving brackets being nested with a correspondingly configured formation of the reinforcing support that has an upwardly open channel with divergent limbs bent to lie in a plane.

2. The roof module of claim 1, wherein the reinforcing plate extends on an upper side of the inner frame over the respective longitudinal frame part of the inner frame and over the receiving bracket.

3. The roof module of claim 1, wherein the reinforcing support is fastened to the receiving bracket via outer fastening screws penetrating the reinforcing plate, the limbs of the receiving bracket and the limbs of the reinforcing support from above and held in outer weld nuts on the limbs of the corresponding formation of the reinforcing support.

4. The roof module of claim 3, further comprising a central weld nut arranged in the channel of the reinforcing support, and the channel of the reinforcing support being connected directly to the channel of the corresponding receiving bracket via a central fastening screw screwed into the central weld nut in the channel of the reinforcing support.

5. The roof module of claim 4, wherein the reinforcing support has a receptacle directly adjacent to the channel, the receptacle nesting with the respective frame parts of the inner frame.

6. A roof module for a motor vehicle with an inner frame connected to a roof with an opening for panorama roof parts that are displaceable in guide rails in the longitudinal direction of the vehicle, the roof module comprising: an inner frame with left and right longitudinal frame parts, receiving brackets arranged fixedly in a central region of the frame parts at a distance behind B pillars of the motor vehicle, each of the receiving brackets defining an upwardly open channel with divergent limbs bent to lie in a plane, and a transversely aligned reinforcing support with left and right ends having upwardly open channels with divergent limbs bent to lie in a plane, ends of the reinforcing support being nested with the respective receiving brackets on the frame parts of the inner frame, keyhole receptacles at each end of the reinforcing support, each of the keyhole receptacles having a square insertion opening and an adjoining slot that runs in a longitudinal direction of the vehicle, hook-shaped receiving elements being provided on the guide rails and having webs inserted in the slots for positioning the reinforcing support, fastening screws penetrating parts of the reinforcing support that are nested with the receiving brackets for fastening the ends of the reinforcing support to the respective frame parts of the inner frame.

7. A roof module for a motor vehicle, with an inner frame that is connected to a roof with an opening for panorama roof parts that are displaceable in guide rails in the longitudinal direction of the vehicle, the roof module comprising: an inner frame with left and right longitudinal frame parts, receiving brackets arranged fixedly in a central region of the frame parts at a distance behind B pillars of the motor vehicle, each of the receiving brackets defining an upwardly open channel with divergent limbs bent to lie in a plane, and a transversely aligned reinforcing support with left and right ends having upwardly open channels with divergent limbs bent to lie in a plane, ends of the reinforcing support being nested with the respective receiving brackets on the frame parts of the inner frame, the reinforcing supports being fastened to the respective receiving bracket by outer fastening screws penetrating the limbs of the receiving bracket and the limbs of the reinforcing support from above and held in outer weld nuts on the limbs of the reinforcing support, the reinforcing support having a receptacle adjacent the channel thereof and nesting with the respective frame parts of the inner frame, wherein the reinforcing support comprises, in cross section, two channel-shaped profiles connected to each other via a web and open at each end into the receptacles of the reinforcing support.

* * * * *